Figure 1:
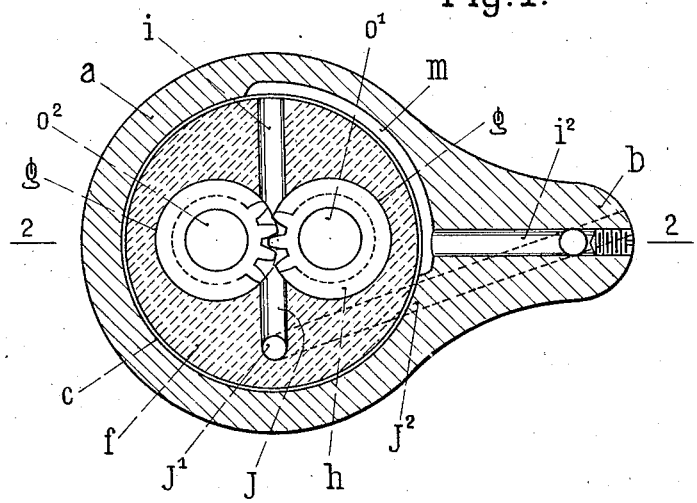

Aug. 17, 1926.

G. APPEL 1,595,982

ROTARY PUMP

Filed March 13, 1926

INVENTOR
Gustav Appel
by
Frank Reinhold
Attorney

Patented Aug. 17, 1926.

1,595,982

UNITED STATES PATENT OFFICE.

GUSTAV APPEL, OF BERLIN, GERMANY.

ROTARY PUMP.

Application filed March 13, 1926, Serial No. 94,423, and in Germany February 23, 1925.

My invention relates to improvements in rotary pumps, and more particularly in pumps of the type comprising a pair of interengaging gear wheels rotating within two adjacent circular chambers having diameters equal to the outer diameters of the gear wheels and connected at opposite sides of the gear wheels respectively with an intake duct and a pressure duct, the liquid such as viscose, being carried within the spaces of the gear wheels from the intake duct to the pressure duct. The object of the improvements is to provide a pump of this type in which the leakage of the liquid being fed within the spaces around the circumference of the gear wheels is avoided, and in which the minute finish of the circumference of the gear wheels and the adjacent wall of the chambers may be dispensed with. With this object in view my invention consists in forming the said chambers within a disk disposed within the pump casing and mounted therein so as to be capable of displacement in any direction transversely of the axes of the gear wheels, and more particularly in a direction substantially perpendicular to the plane including the said axes. Therefore, when the pump is in operation, and pressure is produced within the pressure duct, the said pressure of the liquid tends to separate the said disk and the gear wheels from each other at the side of the pressure duct, so that at the opposite side of the gear wheels the wall of the chamber of the disk is pressed into tight contact with the circumference of the gear wheels, thus preventing leakage of the liquid. In a similar way, where the liquid is supplied to the intake duct of the pump under pressure, as is usual in pumps used for feeding viscose, and when the pump is out of operation, the pressure within the intake pipe and acting on the adjacent circumferential surface of the gear wheels and the walls of the chambers tends to force the disk at the pressure side into contact with the adjacent part of the circumferential surface of the gear wheels, thus preventing leakage of liquid from the intake duct to the pressure duct.

Another object of the invention is to provide a pump of the type referred to in which the pressure of the liquid on the disk is not transmitted to the shafts of the gear wheels, so that the wear of the said shafts and their bearings is reduced to a minimum. It will be understood that in the construction so far referred to the pressures of the liquid acting respectively on the intake and pressure sides balance each other, the pressure acting for example at the pressure side on the gear wheels being transmitted through the disk to the opposite side of the gear wheels. But the pressure of the liquid is also transmitted to the outer circumference of the disk, and in order to balance the said pressure I mount the disk within the pump casing so that it has a clearance all around its circumference, and I connect the annular passage thus produced with the pressure duct, so that the pressure of the liquid acts from all sides on the outer circumference of the disk.

An important feature of my improved construction is that the exact finish of the gear wheels within their chambers may be dispensed with, and further, that the exact finish of the inner circumferential wall of the pump casing and the circumferential surface of the said disk may be dispensed with.

Figure 2:
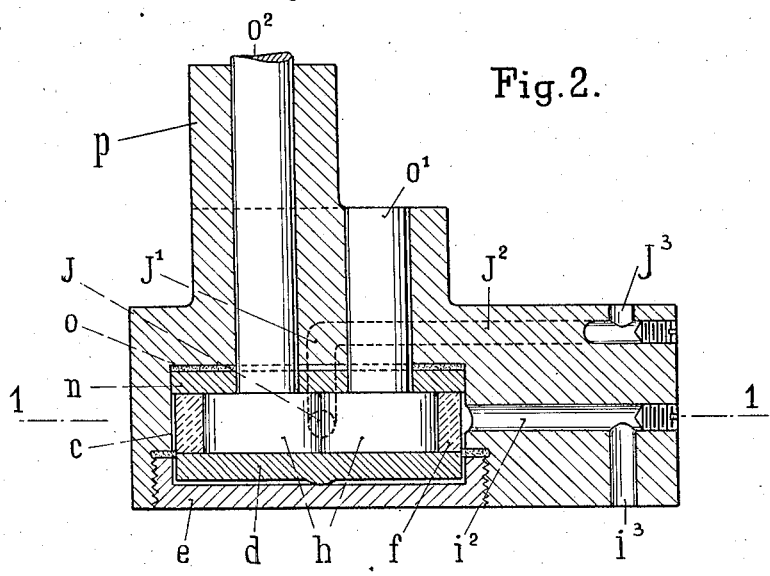

For the purpose of explaining the invention an example embodying the same has been shown in the accompanying drawing, in which the same reference characters have been used in all the views to indicate corresponding parts. In said drawing, Fig. 1, is a sectional elevation taken on line 1—1 of Fig. 2, and Fig. 2, is a sectional plan view taken on the line 2—2 of Fig. 1.

In describing the invention reference will be made to a pump for feeding viscose to spinning nozzles. I have found that in pumps of this class it is particularly important to avoid any leakage of the liquid from the intake duct to the pressure duct or vice versa, because even a small irregularity in the supply of the viscose to the nozzles interferes with the quality of the artificial silk produced.

In the example shown in the drawing my improved pump comprises a cylindrical casing $a$ formed at one side with an extension $b$ by means of which it may be mounted between a pair of trunnions formed with axial bores respectively for the supply and delivery of the viscose, the said bores opening into bores $i^3$ and $j^3$ made in the said extension. The casing $a$ comprises a cylindrical recess $c$ normally closed by a lid $e$ screwing within the said casing. On the inner end face of the chamber $c$ there is a plate $n$, a packing disk $o$ being interposed between the said disk and the adjacent end face of the chamber. On the inner face of the lid e there is a plate d, and between the plates d and n there is a circular disk f the width of which is exactly equal to the distance between the plates d and n, and the outer diameter of which is smaller than the diameter of the chamber c, the difference between the said diameters being not more than a millimeter or even a fraction of a millimeter.

The disk f is formed with two bores g merging into each other at their adjacent sides, and the chamber thus produced is connected with an intake duct j and a pressure duct i. Within the chambers g, g there are interengaging gear wheels h, h the outer diameter of which is equal to the diameter of the bores, and the width of which is exactly equal to the width of the disk f. The axes $o^1$ and $o^2$ of the said gear wheels are mounted in axial bores made in a lug p formed on the casing a. It will be understood that suitable linings and packing media are disposed between the said shafts and the walls of the bores, as is known in the art. But my invention does not relate to the manner of mounting the shafts, and therefore I deem it not necessary to describe the same in detail.

The pressure duct i extends from the chamber g, g to the circumference of the disk f, and it opens into a passage m made in the casing a circumferentially of the chamber c and communicating through a passage $i^2$ with the bore $i^3$. As appears from Fig. 1, the pressure duct i is connected with the annular passage provided between the outer circumference of the disk f and the circumferential wall of the chamber c, so that the pressure within the duct i acts on the disk f from all sides, and no transverse pressure is transmitted to the shafts $o^1$ and $o^2$ and the bearings thereof. The intake duct j ends at a part away from the circumference of the disk f, and it communicates through a transverse bore $j^1$ and a passage $j^2$ with the bore $j^3$.

In describing the operation of the pump it will be assumed that the pump is mounted with the rotor shaft horizontal, as has been shown in Fig. 1. But it will be understood that my invention is not limited to thus mounting the pump.

While the gear wheels are not rotated the viscose supplied to the intake duct j under pressure acts on the bottom side of the gear wheels and the adjacent parts of the wall of the chamber g, g, the said pressure being transmitted more or less to the adjacent parts of the circumference of the gear wheels and the wall of the chambers g, g. By having the disk f floatingly mounted it is forced downwardly by the said pressure, so that a close contact is insured between the upper part of the circumferential surface of the gear wheels and the adjacent parts of the wall of the chambers g, g the said pressure being sufficient to prevent leakage of the viscose from the intake duct around the gear wheels and to the pressure duct. When rotating the gear wheels the viscose is carried around within the spaces between the teeth of the gear wheels, and it is delivered under pressure to the pressure duct i. The pressure within the duct i is transmitted more or less to the minute space between the top face of the gear wheels and the wall of the chambers g, g. Therefore the disk f is forced upwardly, so that close contact is insured between the bottom part of the circumferential surface of the gear wheels and the adjacent part of the wall of the chambers g, g, thus preventing any leakage of liquid from the spaces to the intake duct j. It may be remarked that the pressure of the gear wheels on the wall of the chambers g, g tends to cause increased wear. But this wear is of no import for the reason that the velocity of pumps of the class referred to is small, the viscose has a lubricating action, and nice fitting between the contacting surfaces is not necessary by reason of the displaceability of the disk f.

While in describing the invention reference has been made to a particular example embodying the same I wish it to be understood that my invention is not limited to the construction shown in the drawing, and that various changes may be made in the general arrangement of the apparatus and the construction of its parts without departing from the invention:

I claim:

1. A pump, comprising a casing, a disk mounted within said casing and formed with bores merging into each other at their adjacent sides, a pair of interengaging gear wheels rotatably mounted within said bores, and driving means for said gear wheels, said disk being mounted within said casing for being movable transversely of the plane passing through the axes of said gear wheels, and said casing being formed with intake and pressure passages communicating with said bores respectively at opposite sides of the gear wheels.

2. A pump, comprising a casing, a disk mounted within said casing and formed with bores merging into each other at their adjacent sides, a pair of interengaging gear wheels rotatably mounted within said bores, and driving means for said gear wheels, said disk being mounted within said casing for being movable transversely of the axes of said gear wheels, and said casing being formed with intake and pressure passages communicating with said bores respectively at opposite sides of the gear wheels.

3. A pump, comprising a casing, a disk mounted within said casing and formed with bores merging into each other at their adjacent sides, a pair of interengaging gear wheels rotatably mounted within said bores, and driving means for said gear wheels, said disk being mounted within said casing for being movable transversely of the plane passing through the axes of said gear wheels, and said casing and disk being formed with intake and pressure passages communicating with said bores respectively at opposite sides of the gear wheels.

4. A pump, comprising a casing, a disk mounted within said casing and formed with bores merging into each other at their adjacent sides, a pair of interengaging gear wheels rotatably mounted within said bores, and driving means for said gear wheels, said disk being mounted within said casing for being movable transversely of the plane passing through the axes of said gear wheels, and said casing and disk being formed with intake and pressure passages communicating with said bores respectively at opposite sides of the gear wheels and the passages made in the disk being connected with the passages made in the casing respectively at different sides of the surface of the disk.

5. A pump, comprising a casing, a disk mounted within said casing and formed with bores merging into each other at their adjacent sides, a pair of interengaging gear wheels rotatably mounted within said bores, and driving means for said gear wheels, said disk being mounted within said casing for being movable transversely of the axes of said gear wheels, and said casing being formed with intake and pressure passages communicating with said bores respectively at opposite sides of the gear wheels, and the pressure passage communicating with the space provided between the disk and the inner wall of said casing.

6. A pump, comprising a cylindrical casing, a circular disk mounted within said casing with clearance about its circumference, and formed with bores merging into each other at their adjacent sides, a pair of interengaging gear wheels rotatably mounted within said bores, and driving means for said gear wheels, said disk being mounted within said casing for being movable transversely of the axes of said gear wheels, and said casing and disk being formed with intake and pressure passages communicating with said bores respectively at opposite sides of the gear wheels, the pressure passage made in said disk opening into the circumferential space between the disk and the casing, and the intake passage ending at a part away from the circumference of said disk and being connected with the intake passage made in said casing through a branch passage disposed transversely of the disk.

In testimony whereof I hereunto affix my signature.

GUSTAV APPEL.